(12) United States Patent
Grund et al.

(10) Patent No.: US 8,226,758 B2
(45) Date of Patent: Jul. 24, 2012

(54) DISPERSE DYES MIXTURES

(75) Inventors: Clemens Grund, Hattersheim (DE); Andreas Endres, Leverkusen (DE); Hartwig Jordan, Bergisch-Gladbach (DE); Adrian Murgatroyd, Frankfurt am Main (DE); Stefan Neubauer, Köln (DE); Nigel Hall, Bury (GB); Anthony Lawrence, Manchester (GB); Shinsuke Ono, Fukuoka (JP); Klaus-Wilfried Wanken, Leverkusen (DE)

(73) Assignee: DyStar Colours Deutschland GmbH (DE)

( * ) Notice: Subject to any disclaimer, the term of this patent is extended or adjusted under 35 U.S.C. 154(b) by 160 days.

(21) Appl. No.: 12/519,667

(22) PCT Filed: Dec. 13, 2007

(86) PCT No.: PCT/EP2007/063855
§ 371 (c)(1),
(2), (4) Date: Jun. 17, 2009

(87) PCT Pub. No.: WO2008/074719
PCT Pub. Date: Jun. 26, 2008

(65) Prior Publication Data
US 2010/0071589 A1    Mar. 25, 2010

(30) Foreign Application Priority Data

Dec. 21, 2006 (GB) .................................. 0625624.2

(51) Int. Cl.
*C09D 11/02* (2006.01)
*C09B 67/38* (2006.01)
*C09B 67/40* (2006.01)

(52) U.S. Cl. ............... 106/31.51; 106/31.44; 106/31.48; 106/31.49; 106/31.5; 8/464; 8/639

(58) Field of Classification Search ............... 106/31.51, 106/31.5, 31.49, 31.48, 31.44; 8/639, 464
See application file for complete search history.

(56) References Cited

U.S. PATENT DOCUMENTS

| | | | | |
|---|---|---|---|---|
| 4,119,624 A * | 10/1978 | Boyd et al. | ..................... | 534/851 |
| 5,569,751 A | 10/1996 | Buhler | | |
| 5,998,592 A * | 12/1999 | Hall | ................................. | 534/734 |
| 7,118,604 B2 * | 10/2006 | Brierley et al. | ..................... | 8/643 |
| 7,358,345 B2 * | 4/2008 | Hall | ................................. | 534/753 |
| 7,416,591 B2 * | 8/2008 | Grund et al. | ................. | 106/31.5 |
| 7,682,408 B2 * | 3/2010 | Endres et al. | ..................... | 8/662 |
| 7,824,450 B2 * | 11/2010 | Jordan et al. | ..................... | 8/464 |
| 7,833,291 B2 * | 11/2010 | Jordan et al. | ..................... | 8/464 |
| 7,871,446 B2 * | 1/2011 | Jordan et al. | ..................... | 8/464 |
| 7,875,706 B2 * | 1/2011 | Egli | ................................. | 534/788 |
| 7,892,295 B2 * | 2/2011 | Jordan | ..................... | 8/456 |

FOREIGN PATENT DOCUMENTS

| | | |
|---|---|---|
| EP | 0492893 A2 | 7/1992 |
| GB | 909843 A | 11/1962 |
| JP | 48096621 A | 12/1973 |
| JP | 49036725 A | 4/1974 |
| JP | 54029331 A | 3/1979 |
| JP | 58002352 A | 1/1983 |
| WO | WO-95/20014 A1 | 7/1995 |
| WO | WO-97/04031 A1 | 2/1997 |
| WO | WO-2005/040283 A2 | 5/2005 |
| WO | WO-2005/056690 A1 | 6/2005 |
| WO | WO-2006/037792 A2 | 4/2006 |

OTHER PUBLICATIONS

U.S. Appl. No. 12/524,003, filed Jul. 22, 2009, Jordan et al.

* cited by examiner

*Primary Examiner* — Helene Klemanski
(74) *Attorney, Agent, or Firm* — Connolly Bove Lodge & Hutz LLP

(57) ABSTRACT

The present invention relates to a disperse dye mixture containing (a) two or more disperse dyestuffs of the formula (I)

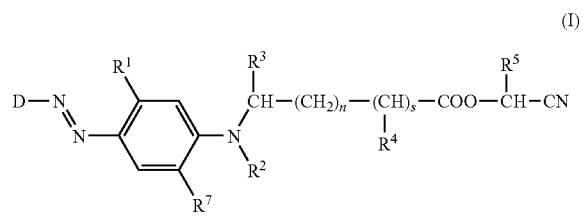

or (b) one or more disperse dyestuffs of the formula (I) and one or more other disperse dyestuffs. The invention also relates to their process of preparation and their use.

17 Claims, No Drawings

DISPERSE DYES MIXTURES

CROSS-REFERENCE TO RELATED APPLICATIONS

This application is a national stage application (under 35 U.S.C. §371) of PCT/EP2007/063855, filed Dec. 13, 2007, which claims benefit of United Kingdom application 0625624.2, filed Dec. 21, 2006.

BACKGROUND OF THE INVENTION

The present invention relates to mixtures of navy to black disperse dyes, particularly to a mixture of disperse azo dyes with anthraquinone or benzodifuranone dyes to achieve navy to black shades and to a process for the colouration of synthetic textile materials and to textile materials when coloured with the mixture of dyes.

Disperse dye mixtures and their use for dyeing polyester and its blends with other fibres such as cellulose, polyurethane, nylon and wool by usual exhaust dyeing, continuous dyeing and direct printing techniques are already known for example from the documents WO 9704031 and EP 0 492 893 A2. However, they have certain application defects, such as for example relatively poor levelling/migration properties, an overly large dependence of the colour yield on varying dyeing parameters in the dyeing process or an insufficient colour build-up on polyester (good colour build-up results from the ability of a dye to provide a proportionally stronger dyeing when used in higher concentrations in the dye bath), or unsatisfactory fastness properties. Thus there is a need for disperse dyes which provide dyeings of improved colour build-up and fastness properties, i.e. wash and light fastness properties of dyed polyester or its blends with other fibres such as cellulose, polyurethane, nylon and wool.

BRIEF SUMMARY OF THE INVENTION

The invention is directed to a disperse dye mixture comprising
(a) two or more disperse dyestuffs of the formula (I)

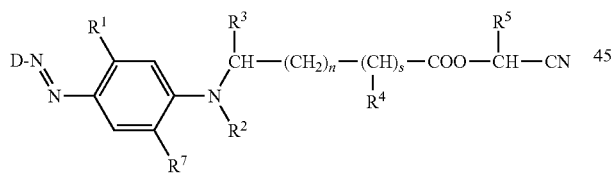
(I)

wherein
D is a group of the formula (IIa)

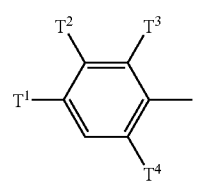
(IIa)

wherein
$T^1$, $T^2$ and $T^3$ are, independently, hydrogen, halogen or nitro;
$T^4$ is hydrogen, halogen, cyano or nitro;
wherein at least one of $T^1$, $T^2$, $T^3$ and $T^4$ is not hydrogen;
or a group of the formula (IIb)

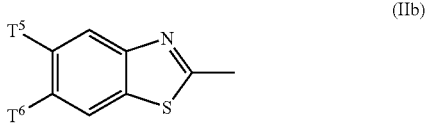
(IIb)

wherein
$T^5$ is hydrogen or halogen; and
$T^6$ is hydrogen —$SO_2CH_3$, —SCN or nitro;
wherein at least one of $T^5$ and $T^6$ is not hydrogen;
or a group of the formula (IIc)

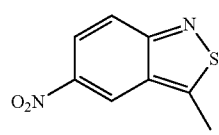
(IIc)

or a group of the formula (IId)

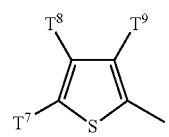
(IId)

wherein
$T^7$ is nitro, —CHO or a group of the formula

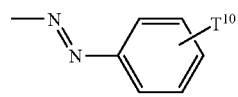

wherein $T^{10}$ is hydrogen, halogen, nitro or cyano;
$T^8$ is hydrogen or halogen; and
$T^9$ is nitro, cyano, —$COCH_3$ or —$COOT^{11}$, wherein $T^{11}$ is $(C_1$-$C_4)$-alkyl;
or a group of the formula (IIe)

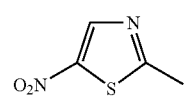
(IIe)

$R^1$ is hydrogen, $(C_1$-$C_4)$-alkyl or —$NHCOR^6$, where $R^6$ is $(C_1$-$C_4)$-alkyl or phenyl;
$R^2$ is unsubstituted $(C_1$-$C_6)$-alkyl, substituted $(C_1$-$C_6)$-alkyl, benzyl or phenylethyl;
$R^3$ is hydrogen or methyl;
$R^4$ is hydrogen or methyl;
$R^5$ is hydrogen, methyl or phenyl;
$R^7$ is hydrogen, chloro, methoxy or ethoxy;
n is 0, 1 or 2 and;
s is 0 or 1;
or
(b) one or more disperse dyestuffs of the formula (I) as defined above and one or more other disperse dyestuffs.
The invention also relates to their process of preparation and their use.

The present invention provides mixtures of disperse dyes which provide dyeings of very good colour build up, wet and light fastness properties on polyester or its blends with other fibres, particularly in the deep black shade area.

DETAILED DESCRIPTION OF THE INVENTION

Accordingly, the present invention provides a disperse dye mixture comprising (a) two or more disperse dyestuffs of the formula (I)

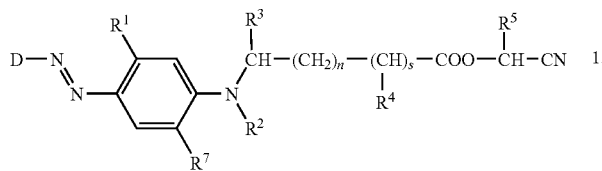
(I)

wherein
D is a group of the formula (IIa)

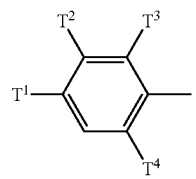
(IIa)

wherein
$T^1$, $T^2$ and $T^3$ are, independently, hydrogen, halogen or nitro;
$T^4$ is hydrogen, halogen, cyano or nitro;
wherein at least one of $T^1$, $T^2$, $T^3$ and $T^4$ is not hydrogen;
or a group of the formula (IIb)

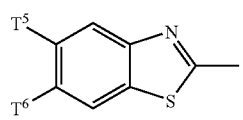
(IIb)

wherein
$T^5$ is hydrogen or halogen; and
$T^6$ is hydrogen —$SO_2CH_3$, —SCN or nitro;
wherein at least one of $T^5$ and $T^6$ is not hydrogen;
or a group of the formula (IIc)

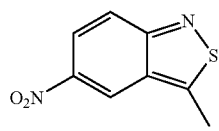
(IIc)

or a group of the formula (IId)

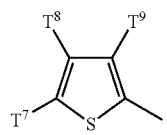
(IId)

wherein
$T^7$ is nitro, —CHO or a group of the formula

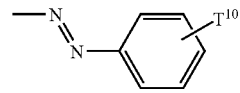

wherein $T^{10}$ is hydrogen, halogen, nitro or cyano;
$T^8$ is hydrogen or halogen; and
$T^9$ is nitro, cyano, —$COCH_3$ or —$COOT^{10}$, wherein $T^{10}$ is $(C_1-C_4)$-alkyl;
or a group of the formula (IIe)

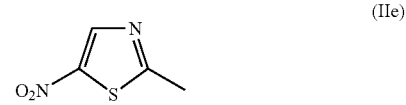
(IIe)

$R^1$ is hydrogen, $(C_1-C_4)$-alkyl or —$NHCOR^6$, where $R^6$ is $(C_1-C_4)$-alkyl or phenyl;
$R^2$ is unsubstituted $(C_1-C_6)$-alkyl, substituted $(C_1-C_6)$-alkyl, benzyl or phenylethyl;
$R^3$ is hydrogen or methyl;
$R^4$ is hydrogen or methyl;
$R^5$ is hydrogen, methyl or phenyl;
$R^7$ is hydrogen, chloro, methoxy or ethoxy;
n is 0, 1 or 2 and;
s is 0 or 1;
or
(b) one or more disperse dyestuffs of the formula (I) as defined above and one or more other disperse dyestuffs.

Within the scope of the present invention alkyl groups may be straight-chain or branched. $(C_1-C_4)$-alkyl groups are preferably methyl, ethyl, n-propyl, i-propyl, n-butyl, i-butyl, sec.-butyl or tert.-butyl. $(C_1-C_6)$-alkyl groups can in addition be for example pentyl or hexyl whereas $(C_1-C_8)$-alkyl groups can in addition be for example heptyl or octyl and $(C_2-C_{10})$-alkyl groups also nonyl and decyl. The same logic applies to alkoxy groups.

Substituted alkyl groups standing for $R^2$ are preferably substituted by hydroxyl, $(C_1-C_4)$-alkoxy or halogen.

Halogen preferably is fluorine, chlorine or bromine and especially preferably chlorine or bromine.

Preferred dyestuff mixtures according to the present invention comprise one or more dyestuffs of the formula (Ia)

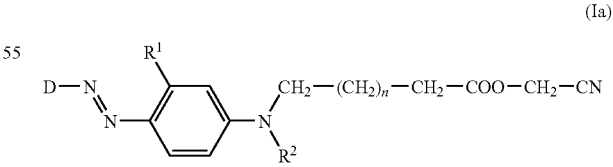
(Ia)

wherein
D is a group of the formulae (IIa), (IIb), (IIc), (IId) or (IIe);
$R^1$ is $(C_1-C_4)$-alkyl, preferably methyl;
$R^2$ is unsubstituted $(C_1-C_6)$-alkyl, benzyl or phenylethyl, preferably ethyl; and
n is 0, 1 or 2, preferably 0.

Further preferred dyestuff mixtures according to the present invention comprise one or more dyestuffs of the formula (Ib)

(Ib)

$$O_2N\text{-}\underset{Cl}{\underset{|}{\overset{T^3}{\overset{|}{\bigcirc}}}}\text{-}N\text{=}N\text{-}\bigcirc\text{-}N(R^2)\text{-}CH_2\text{-}CH_2\text{-}COO\text{-}CH_2\text{-}CN$$

wherein
$T^3$ is bromo or chloro; and
$R^2$ is unsubstituted $(C_1\text{-}C_6)$-alkyl, substituted $(C_1\text{-}C_6)$-alkyl, benzyl or phenylethyl, preferably ethyl, benzyl or phenethyl.

Still further preferred dyestuff mixtures according to the present invention comprise one or more dyestuffs of the formula (Ic)

(Ic)

$$D\text{-}N\text{=}N\text{-}\underset{}{\overset{R^1}{\bigcirc}}\text{-}N(R^2)\text{-}\underset{R^4}{\overset{R^3}{\overset{|}{C}H}}\text{-}CH\text{-}COO\text{-}CH_2\text{-}CN$$

wherein
D is a group of the formulae (IIa), (IIb), (IIc), (IId) or (IIe);
$R^1$ is hydrogen, $(C_1\text{-}C_4)$-alkyl or —NHCOR$^6$, where $R^6$ is $(C_1\text{-}C_4)$-alkyl or phenyl;
$R^2$ is unsubstituted $(C_1\text{-}C_6)$-alkyl, substituted $(C_1\text{-}C_6)$-alkyl, benzyl or phenylethyl; and
$R^3$ is hydrogen and $R^4$ is methyl or $R^3$ is methyl and $R^4$ is hydrogen.

Still further preferred dyestuff mixtures according to the present invention comprise one or more dyestuffs of the formula (Id)

(Id)

$$D\text{-}N\text{=}N\text{-}\underset{}{\overset{R^1}{\bigcirc}}\text{-}N(R^2)\text{-}CH_2\text{-}CH_2\text{-}COO\text{-}\underset{}{\overset{R^5}{\overset{|}{C}H}}\text{-}CN$$

wherein
D is a group of the formulae (IIa), (IIb), (IIc), (IId) or (IIe);
$R^1$ is hydrogen, $(C_1\text{-}C_4)$-alkyl or —NHCOR$^6$, where $R^6$ is $(C_1\text{-}C_4)$-alkyl or phenyl;
$R^2$ is unsubstituted $(C_1\text{-}C_6)$-alkyl, substituted $(C_1\text{-}C_6)$-alkyl, benzyl or phenylethyl; and
$R^5$ is methyl or phenyl;

Still further preferred dyestuff mixtures according to the present invention comprise one or more dyestuffs of the formula (Ie)

(Ie)

$$D\text{-}N\text{=}N\text{-}\underset{R^7}{\underset{|}{\overset{R^6COHN}{\overset{|}{\bigcirc}}}}\text{-}N(R^2)\text{-}CH_2\text{-}(CH_2)_n\text{-}CH_2\text{-}COO\text{-}CH_2\text{-}CN$$

wherein
D is a group of the formulae (IIa), (IIb), (IIc), (IId) or (IIe);
$R^2$ is unsubstituted $(C_1\text{-}C_6)$-alkyl, substituted $(C_1\text{-}C_6)$-alkyl, benzyl or phenylethyl;
$R^6$ is $(C_1\text{-}C_4)$-alkyl or phenyl;
$R^7$ is chloro, methoxy or ethoxy; and
n is 0, 1 or 2.

Still further preferred dyestuff mixtures according to the present invention comprise one or more dyestuffs of the formula (If)

(If)

$$R^8\text{-}\bigcirc\text{-}N\text{=}N\text{-}\underset{S}{\overset{CN}{\bigcirc}}\text{-}N\text{=}N\text{-}\bigcirc\text{-}N(R^2)\text{-}CH_2\text{-}(CH_2)_n\text{-}CH_2\text{-}COO\text{-}CH_2\text{-}CN$$

wherein
$R^2$ is unsubstituted $(C_1\text{-}C_6)$-alkyl, substituted $(C_1\text{-}C_6)$-alkyl, benzyl or phenylethyl;
$R^8$ is nitro; and
n is 0, 1 or 2;

Still further preferred dyestuff mixtures according to the present invention comprise one or more dyestuffs of the formula (Ig)

(Ig)

$$D\text{-}N\text{=}N\text{-}\underset{}{\overset{R^1}{\bigcirc}}\text{-}N(R^2)\text{-}\underset{}{\overset{R^3}{\overset{|}{C}H}}\text{-}COO\text{-}CH_2\text{-}CN$$

wherein
D is a group of the formulae (IIa), (IIb), (IIc), (IId) or (IIe);
$R^1$ is hydrogen, $(C_1\text{-}C_4)$-alkyl or —NHCOR$^6$, where $R^6$ is $(C_1\text{-}C_4)$-alkyl or phenyl;

$R^2$ is unsubstituted $(C_1-C_6)$-alkyl, substituted $(C_1-C_6)$-alkyl, benzyl or phenylethyl; and
$R^3$ is hydrogen or methyl.

Still further preferred dyestuff mixtures according to the present invention comprise one or more dyestuffs of the formula (I) in which D derives from an amine selected from the group consisting of 2-nitroaniline, 3-nitroaniline, 4-nitroaniline, 2-chloro-4-nitroaniline, 4-chloro-2-nitroaniline, 2-bromo-4-nitroaniline, 2,6-dichloro-4-nitroaniline, 2,6-dibromo-4-nitroaniline, 2-chloro-6-bromo-4-nitroaniline, 2,5-dichloro-4-nitroaniline, 2-cyano-4-nitroaniline, 2-cyano-6-bromo-4-nitroaniline, 2-cyano-6-chloro-4-nitroaniline, 2,4-dinitroaniline, 2-chloro-4,6-dinitroaniline, 2-bromo-4,6-dinitroaniline, 2,6-dicyano-4-nitroaniline, 2-cyano-4,6-dinitroaniline, 2-amino-5-nitrothiazole, 2-amino-3,5-dinitrothiophene, 2-amino-3-ethoxycarbonyl-5-nitrothiophene, 2-amino-3-acetyl-5-nitrothiophene, 2-amino-3-cyano-5-nitrothiophene, 2-amino-3-cyano-4-chloro-5-formylthiophene, 7-amino-5-nitrobenzoisothiazole, 2-amino-6-nitrobenzothiazole, 2-amino-6-methylsulphonylbenzothiazole; 2-amino-6-thiocyanatobenzothiazole, 2-amino-5,6-dichlorobenzothiazole and 2-amino-6,7-dichlorobenzothiazole (mixture).

Especially preferred dyestuff mixtures according to the present invention comprise one or more dyestuffs of the formulae I-1 to I-52 as given in Table 1 below.

TABLE 1

| Dye | D | $R^1$ | $R^2$ | $R^3$ | $R^4$ | $R^5$ | $R^7$ | n | s |
|---|---|---|---|---|---|---|---|---|---|
| I-1 | 4-Br, 3-CN, 2-Me, $O_2N$-phenyl | $CH_3$ | $C_2H_5$ | H | — | H | H | 3 | 0 |
| I-2 | 2-CN, 3-Br, 4-Me, $O_2N$-phenyl | $CH_3$ | $C_2H_5$ | $CH_3$ | — | H | H | 1 | 0 |
| I-3 | 4-Br, 3-CN, 2-Me, $O_2N$-phenyl | $CH_3$ | $C_2H_5$ | H | — | $CH_3$ | H | 1 | 0 |
| I-4 | 4-Br, 3-$NO_2$, 2-Me, $O_2N$-phenyl | $NHCOCH_3$ | $C_2H_5$ | H | — | H | methoxy | 1 | 0 |
| I-5 | 2-$NO_2$, $O_2N$-phenyl | $NHCOCH_3$ | $C_2H_5$ | H | — | H | methoxy | 1 | 0 |
| I-6 | 4-CN, 3-Br, 2-Me, $O_2N$-phenyl | $NHCOCH_3$ | $C_2H_5$ | H | — | H | H | 1 | 0 |
| I-7 | 2-$NO_2$, 4-Me, 3-Cl, $O_2N$-phenyl | $NHCOCH_3$ | $C_2H_5$ | H | — | H | methoxy | 1 | 0 |

TABLE 1-continued

| Dye | D | R¹ | R² | R³ | R⁴ | R⁵ | R⁷ | n | s |
|---|---|---|---|---|---|---|---|---|---|
| I-8 | (thiophene: Cl, CN, CHO, CH₃) | H | C₂H₅ | H | — | H | H | 1 | 0 |
| I-9 | (phenyl: CN, O₂N, Cl, CH₃) | CH₃ | C₂H₅ | H | — | H | H | 1 | 0 |
| I-10 | (phenyl: NO₂, O₂N, Cl, CH₃) | NHCOCH₃ | C₂H₅ | H | — | H | H | 1 | 0 |
| I-11 | (phenyl: C≡N, O₂N, Cl, CH₃) | NHCOCH₃ | C₂H₅ | H | — | H | H | 1 | 0 |
| I-12 | (benzisothiazole: N-S, CH₃, O₂N) | CH₃ | propyl | H | — | H | H | 1 | 0 |
| I-13 | (phenyl: NO₂, O₂N, Cl, CH₃) | NHCOC₃H₇ | H | H | — | H | methoxy | 1 | 0 |
| I-14 | (phenyl: NO₂, O₂N, Br, CH₃) | NHCOC₂H₅ | C₂H₅ | H | — | H | methoxy | 1 | 0 |
| I-15 | (phenyl: NO₂, O₂N, Cl, CH₃) | NHCOC₂H₅ | C₂H₅ | H | — | H | methoxy | 1 | 0 |
| I-16 | (phenyl: NO₂, O₂N, CH₃) | NHCOC₂H₅ | CH₃ | H | — | H | methoxy | 1 | 0 |

TABLE 1-continued

| Dye | D | R¹ | R² | R³ | R⁴ | R⁵ | R⁷ | n | s |
|---|---|---|---|---|---|---|---|---|---|
| I-17 | 2,4-dinitro-5-methylphenyl | NHCOC₂H₅ | C₂H₅ | H | — | H | methoxy | 1 | 0 |
| I-18 | 5-nitro-3-methyl-benzisothiazolyl | CH₃ | C₂H₅ | H | — | H | H | 1 | 0 |
| I-19 | 5-nitro-3-methyl-benzisothiazolyl | H | phen-ethyl | H | — | H | H | 1 | 0 |
| I-20 | 5-nitro-3-methyl-benzisothiazolyl | H | butyl | H | — | H | H | 1 | 0 |
| I-21 | 2,6-dicyano-5-nitro-3-methylphenyl | CH₃ | ethyl | H | — | H | H | 1 | 0 |
| I-22 | 2-cyano-4-bromo-6-cyano-5-nitro-3-methylphenyl | CH₃ | propyl | H | — | H | H | 1 | 0 |
| I-23 | 2-cyano-4-bromo-6-cyano-5-nitro-3-methylphenyl | CH₃ | n-butyl | H | — | H | H | 1 | 0 |
| I-24 | 2-bromo-6-cyano-5-nitro-3-methylphenyl | CH₃ | C₂H₅ | H | — | H | H | 1 | 0 |

TABLE 1-continued
| Dye | D | $R^1$ | $R^2$ | $R^3$ | $R^4$ | $R^5$ | $R^7$ | n | s |
|---|---|---|---|---|---|---|---|---|---|
| I-25 | 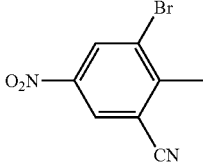 | $CH_3$ | phen-ethyl | H | — | H | H | 1 | 0 |
| I-26 | 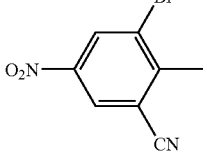 | $CH_3$ | $CH_3$ | H | — | H | H | 1 | 0 |
| I-27 | 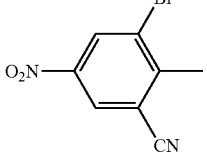 | $CH_3$ | $C_2H_5$ | H | — | $CH_3$ | H | 1 | 0 |
| I-28 | 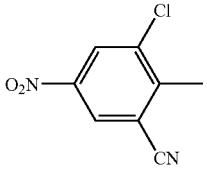 | $CH_3$ | $C_2H_5$ | H | — | H | H | 1 | 0 |
| I-29 | 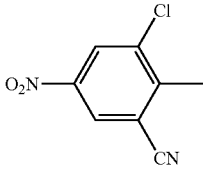 | H | $C_2H_5$ | H | — | H | H | 1 | 0 |
| I-30 | 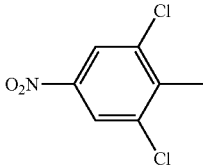 | H | $C_2H_5$ | H | — | H | H | 1 | 0 |
| I-31 | 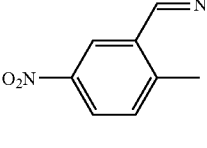 | $CH_3$ | phen-ethyl | H | — | H | H | 1 | 0 |
| I-32 | 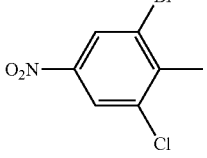 | $CH_3$ | $C_2H_5$ | H | — | H | H | 1 | 0 |
| I-33 | 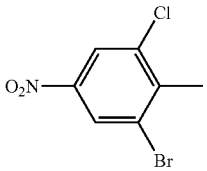 | $CH_3$ | $CH_3$ | H | — | H | H | 1 | 0 |

TABLE 1-continued
| Dye | D | R¹ | R² | R³ | R⁴ | R⁵ | R⁷ | n | s |
|---|---|---|---|---|---|---|---|---|---|
| I-34 | 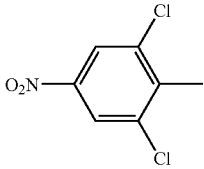 | CH₃ | CH₃ | H | — | H | H | 1 | 0 |
| I-35 | 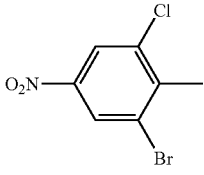 | CH₃ | phen-ethyl | H | — | H | H | 1 | 0 |
| I-36 | 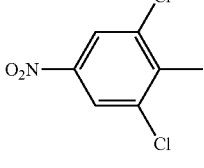 | CH₃ | phen-ethyl | H | — | H | H | 1 | 0 |
| I-37 | 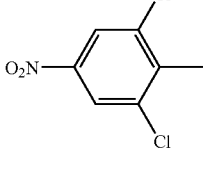 | CH₃ | propyl | H | — | H | H | 1 | 0 |
| I-38 | 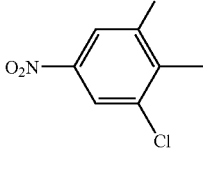 | H | propyl | H | — | H | H | 1 | 0 |
| I-39 | 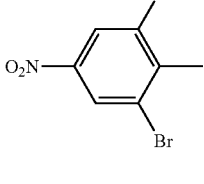 | H | ethyl | H | — | H | H | 1 | 0 |
| I-40 | 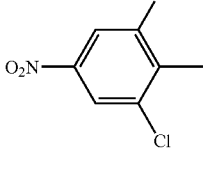 | H | ethyl | H | CH₃ | H | H | 0 | 1 |
| I-41 | 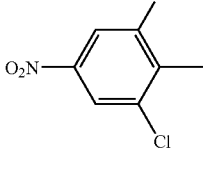 | CH₃ | ethyl | H | CH₃ | H | H | 0 | 1 |

TABLE 1-continued
| Dye | D | R¹ | R² | R³ | R⁴ | R⁵ | R⁷ | n | s |
|---|---|---|---|---|---|---|---|---|---|
| I-42 | 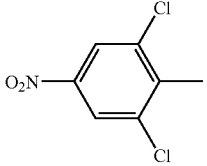 | CH₃ | ethyl | H | — | H | H | 1 | 0 |
| I-43 | 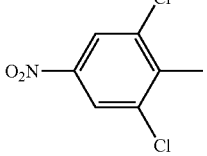 | H | butyl | H | — | H | H | 1 | 0 |
| I-44 | 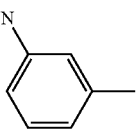 | H | ethyl | H | — | H | H | 1 | 0 |
| I-45 | 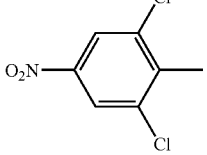 | H | ethyl | H | — | H | H | 1 | 0 |
| I-46 | 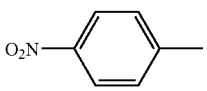 | CH₃ | ethyl | H | — | H | H | 1 | 0 |
| I-47 | 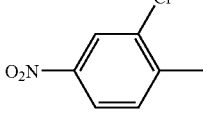 | CH₃ | ethyl | H | — | H | H | 1 | 0 |
| I-48 | 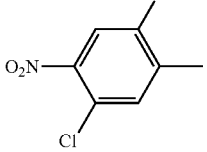 | CH₃ | ethyl | H | — | H | H | 1 | 0 |
| I-49 | 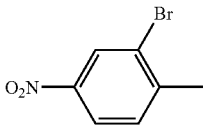 | CH₃ | ethyl | H | — | H | H | 1 | 0 |
| I-50 | 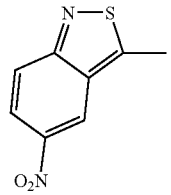 | CH₃ | ethyl | H | — | H | H | 1 | 0 |
| I-51 | 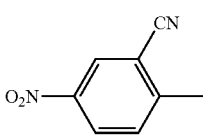 | CH₃ | ethyl | H | — | H | H | 1 | 0 |

TABLE 1-continued

| Dye | D | R¹ | R² | R³ | R⁴ | R⁵ | R⁷ | n | s |
|---|---|---|---|---|---|---|---|---|---|
| I-52 | 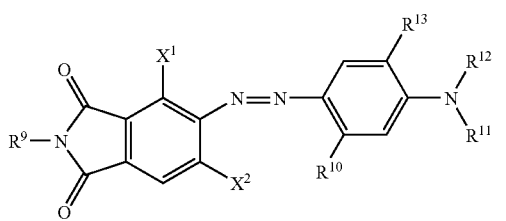 | CH₃ | ethyl | H | — | H | H | 1 | 0 |

Within the scope of the present invention the term other disperse dyestuff comprises all disperse dyestuffs which can be used for dyeing of hydrophobic materials, preferably polyester textile materials. Such dyestuffs are known to a person of ordinary skill in the art, are extensively described in literature and are available at the market.

Preferred disperse dyestuffs which can be used together with the dyestuffs of the general formula (I) to form inventive dyestuff mixtures are for example the dyestuffs of the formula (III)

(III)

wherein
each of $X^1$ and $X^2$, independently are hydrogen or cyano;
$R^9$ is $(C_2-C_{10})$-alkyl oder $-(CH_2)_oCOOR^{14}$;
$R^{10}$ is hydrogen, methyl, cyanomethyl, halogenmethyl, ethyl, cyanoethyl, halogenethyl, halogen, $-NH-CO-R^{15}$ or $-NH-SO_2-R^{15}$;
$R^{11}$ is unsubstituted $(C_1-C_8)$-alkyl or $(C_1-C_8)$-alkyl substituted by hydroxy, $(C_1-C_4)$-alkoxy, cyano, halogen, $-OCOR^{15}$, $COOR^{15}$, vinyl or phenyl;
$R^{12}$ is hydrogen, unsubstituted $(C_1-C_8)$-alkyl or $(C_1-C_8)$-alkyl substituted by hydroxy, $(C_1-C_4)$-alkoxy, cyano, halogen, $-OCOR^7$, $COOR^7$, vinyl or phenyl;
$R^{13}$ is hydrogen, halogen, $(C_1-C_4)$-alkyl, unsubstituted $(C_1-C_8)$-alkoxy or $(C_1-C_8)$-alkoxy substituted by halogen, cyano or phenyl;
$R^{14}$ is $(C_1-C_4)$-alkyl;
$R^{15}$ is unsubstituted $(C_1-C_8)$-alkyl or $(C_1-C_8)$-alkyl substituted by halogen or cyano;
and
o is 1, 2, 3, 4 or 5.

Especially preferred disperse dyestuffs of the formula (III) are those in which
$R^9$ is ethyl or n-butyl; and
$R^{10}$ is cyanomethyl, halogenmethyl, ethyl, cyanoethyl, halogenethyl, halogen, $-NH-CO-R^{15}$ or $-NH-SO_2-R^{15}$; wherein in case $R^{10}$ is $-NH-CO-R^{15}$, it is especially preferred acetylamino or propionylamino and wherein in case $R^{10}$ is $-NH-SO_2-R^{15}$, it is especially preferred methylsulfamino or ethylsulfamino; and/or
each of $R^{11}$ and $R^{12}$, independently is $(C_1-C_4)$-alkyl, especially preferred methyl or ethyl, or is $(C_1-C_4)$-alkyl substituted by methoxy or ethoxy; and/or $R^{13}$ is hydrogen, $(C_1-C_8)$-alkoxy, especially preferred $(C_1-C_4)$-alkoxy like methoxy and ethoxy.

Further especially preferred disperse dyestuffs of the formula (III) are of the formula (IIIa)

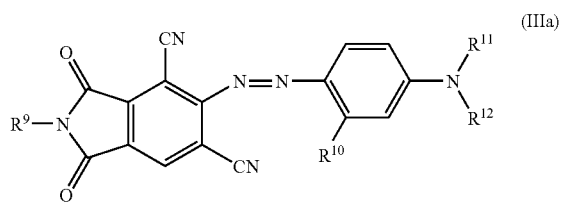

(IIIa)

wherein
$R^9$ is n-pentyl or $-(CH_2)_oCOOR^{14}$;
$R^{10}$ is methyl, $-NH-CO$-methyl or $-NH-SO_2$-methyl;
$R^{11}$ and $R^{12}$ independently are ethyl, $-(CH_2)_2CN$, $-(CH_2)_2OMe$, $-(CH_2)_2OAc$ or n-butyl;
$R^{14}$ is methyl, ethyl or butyl; and
o is 1, 2 or 3.

Still further especially preferred disperse dyestuffs of the formula (III) are of the formula (IIIb)

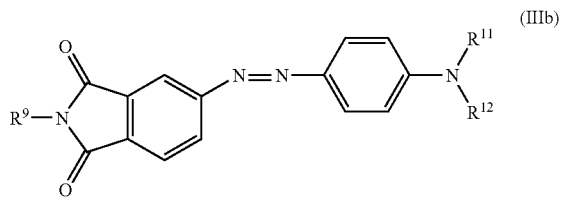

(IIIb)

wherein
$R^9$ is ethyl or $-(CH_2)_oCOOR^{14}$;
$R^{11}$ and $R^{12}$ independently are ethyl, $-(CH_2)_2CN$, $-(CH_2)_2OMe$, $-(CH_2)_2OAc$ or n-butyl;
$R^{14}$ is methyl, ethyl or butyl; and
o is 1, 2, 3 or 5.

Still further especially preferred disperse dyestuffs of the formula (III) are of the formula (IIIc)

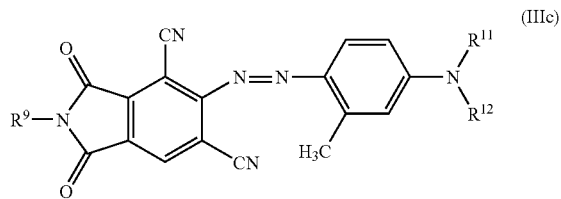

(IIIc)

wherein

R⁹ is iso-propyl, iso-butyl, sec.-butyl oder tert.-butyl; and $R^{11}$ and $R^{12}$ independently are ethyl, —$(CH_2)_2CN$, —$(CH_2)_2OMe$, —$(CH_2)_2OAc$ or n-butyl.

Exceptionally preferred disperse dyestuffs of the formula (III) which can be used together with the dyestuffs of the general formula (I) to form inventive dyestuff mixtures are the dyestuffs of the formulae III-1 to III-15 as given in Table 2 below.

TABLE 2

[Structure: phthalimide with R⁹-N, two CN groups, and N=N-azo linkage to phenyl ring bearing R¹⁰ and N(R¹¹)(R¹²)]

| Dye | R⁹ | R¹⁰ | R¹¹ | R¹² |
|---|---|---|---|---|
| III-1 | n-pentyl | $CH_3$ | $C_2H_5$ | $C_2H_5$ |
| III-2 | ethyl –O–C(=O)–CH₂–CH₂–* | H | n-butyl | propyl |
| III-3 | ethyl –O–C(=O)–CH₂–CH₂–CH₂–* | —$NHCOCH_3$ | $i\text{-}C_3H_7$ | $C_2H_5$ |
| III-4 | ethyl –O–C(=O)–CH₂–CH₂–CH₂–CH₂– | —$NHCOCH_3$ | $C_2H_5$ | $C_2H_5$ |
| III-5 | ethyl –O–C(=O)–CH₂–CH₂–* | $CH_3$ | $C_2H_5$ | $C_2H_5$ |
| III-6 | ethyl –O–C(=O)–CH₂–CH₂–CH₂– | —$NHCOCH_3$ | $C_2H_5$ | $C_2H_5$ |
| III-7 | HO–(CH₂)₄–O–(CH₂)₃–CH₃ | $CH_3$ | $C_2H_5$ | $C_2H_5$ |
| III-8 | methyl –O–C(=O)–CH₂–CH₂– | $CH_3$ | $C_2H_5$ | $C_2H_5$ |
| III-9 | ethyl –O–C(=O)–CH₂–CH₂– | $CH_3$ | $C_2H_5$ | $C_2H_5$ |
| III-10 | isopropyl | $CH_3$ | $C_2H_5$ | $C_2H_5$ |
| III-11 | n-butyl | —$NHCOCH_3$ | methoxyethyl | methoxyethyl |
| III-12 | isobutyl | $CH_3$ | $C_2H_5$ | $C_2H_5$ |
| III-13 | 2,2-dimethyl-propyl | $CH_3$ | $C_2H_5$ | $C_2H_5$ |
| III-14 | n-pentyl | —$NHSO_2CH_3$ | $C_2H_5$ | $C_2H_5$ |
| III-15 | n-butyl | —$NHCOCH_3$ | $C_2H_5$ | $C_2H_5$ |

Further preferred disperse dyestuffs which can be used together with the dyestuffs of the formula (I) to form inventive dyestuff mixtures are the dyestuffs of formula (IV)

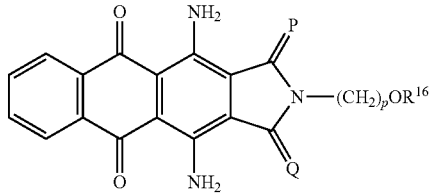

(IV)

wherein
P and Q are both O or one is O and one is NH;
p is 1, 2, 3 or 4; and
$R^{16}$ is hydrogen, $(C_1-C_4)$-alkyl or $(C_1-C_4)$-alkoxy-$(C_1-C_4)$-alkyl.

Exceptionally preferred disperse dyestuffs of the formula (IV) which can be used together with the dyestuffs of the general formula (I) to form inventive dyestuff mixtures are the dyestuffs of the formulae IV-1 to IV-7 as given in Table 3 below.

TABLE 3

| Dye | P | Q | $R^{16}$ | p |
|---|---|---|---|---|
| IV-1 | O | O | $C_2H_4OCH_3$ | 3 |
| IV-2 | O | O | $CH_3$ | 3 |
| IV-3 | O | O | $C_2H_5$ | 3 |
| IV-4 | O | O | H | 2 |
| IV-5 | O | O | $C_3H_7$ | 3 |
| IV-6 | O | O | $C_4H_9$ | 2 |
| IV-7 | O | O | $(CH_3)_2CH$ | 3 |

Still further preferred disperse dyestuffs which can be used together with the dyestuffs of the formula (I) to form inventive dyestuff mixtures are the dyestuffs of formula (V)

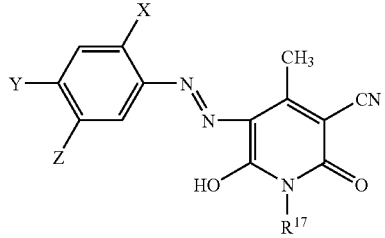

(V)

wherein
$R^{17}$ is hydrogen, $(C_1-C_4)$-alkyl, $(C_1-C_4$-alkoxy-$(C_1-C_4)$-alkyl or aryloxy-$(C_1-C_4)$-alkyl;

X is hydrogen, halogen, $(C_1-C_4)$-alkyl, nitro or cyano;

Y is hydrogen, halogen, $(C_1-C_4)$-alkyl, nitro, $(C_1-C_4)$-alkoxy-$(C_1-C_4)$-alkoxy-$(C_1-C_4)$-alkoxycarbonyl, aryl-$(C_1-C_4)$-alkoxycarbonyl, mono- or di-$(C_1-C_4)$-alkylamino-carbonyl, $(C_1-C_4)$-alkyl-$(C_1-C_4)$-alkoxycarbonyl or $R^{18}SO_2$;

Z is hydrogen, hydroxyl, halogen, aryloxy-$(C_1-C_4)$-alkoxycarbonyl, aryl-$(C_1-C_4)$-alkoxycarbonyl, —$OSO_2$aryl or $R^{18}SO_2$; and $R^{18}$ is aryloxy, or mono- or di-$(C_1-C_4)$-alkylamino.

Exceptionally preferred disperse dyestuffs of the formula (V) which can be used together with the dyestuffs of the general formula (I) to form inventive dyestuff mixtures are the dyestuffs of the formulae V-1 to V-25 as given in Table 4 below.

TABLE 4

| Dye | X | Y | Z | $R^{17}$ |
|---|---|---|---|---|
| V-1 | H | H | $OSO_2C_6H_5$ | $CH_3$ |
| V-2 | $NO_2$ | H | H | $C_2H_5$ |
| V-3 | H | $CH_3OC_2H_4OC_2H_4OOC$— | H | $C_2H_5$ |
| V-4 | H | H | $COOCH_2C_6H_5$ | $C_3H_6OCH_3$ |
| V-5 | Cl | $NO_2$ | H | H |
| V-6 | H | $C_4H_9(C_2H_5)CHC_2H_4NHSO_2$— | H | $C_4H_9$ |
| V-7 | H | $C_4H_9(C_2H_5)CHCH_2NHCO$— | H | $CH_3$ |
| V-8 | H | Cl | H | $C_4H_9$ |
| V-9 | H | —$OSO_2C_6H_5$ | H | $C_3H_6OCH_3$ |
| V-10 | H | ![tetrahydrofurfuryl acetate structure] | H | $C_4H_9$ |
| V-11 | H | para$(CH_3)_2CHC_6H_5CO$— | H | H |
| V-12 | H | $C_6H_5CH_2OCO$— | H | $C_4H_9$ |
| V-13 | $NO_2$ | Cl | H | $C_3H_7/C_4H_9$ |
| V-14 | H | Cl | H | H |
| V-15 | H | Cl | Cl | $CH_3$ |
| V-16 | H | Cl | Cl | $C_4H_9$ |
| V-17 | H | H | $C_6H_5OC_2H_4OOC$— | $CH_3$ |
| V-18 | $NO_2$ | methoxy | H | $C_2H_5$ |
| V-19 | $NO_2$ | methoxy | H | iso-octyl |
| V-20 | $NO_2$ | methoxy | H | isopropoxypropyl |

TABLE 4-continued

| Dye | X | Y | Z | $R^{17}$ |
|---|---|---|---|---|
| V-21 | H | (phenoxyethyl acetate group) | H | $CH_3$ |
| V-22 | $NO_2$ | ethoxy | H | $CH_3$ |
| V-23 | $NO_2$ | methoxy | H | $-C_2H_4OH$ |
| V-24 | $NO_2$ | methoxy | H | propyl |
| V-25 | $NO_2$ | ethoxy | H | propyl |

Still further preferred disperse dyestuffs which can be used together with the dyestuffs of the formula (I) to form inventive dyestuff mixtures are the dyestuffs of formula (VI)

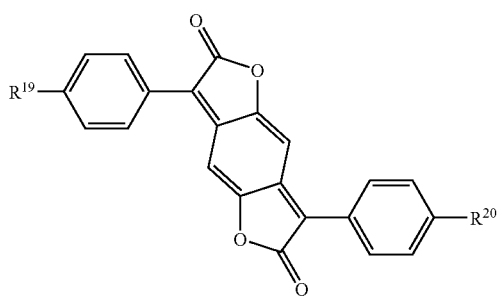

(VI)

wherein
$R^{19}$ and $R^{20}$ independently are hydrogen, $(C_1\text{-}C_4)$-alkoxy, $(C_2\text{-}C_4)$-alkenyloxy or $-O(CH_2)_qR^{22}$
wherein
q is an integer from 1 to 6; and
$R^{22}$ is $-OR^{23}$ or $-COR^{24}$;
where
$R^{23}$ is hydrogen, $(C_1\text{-}C_4)$-alkyl, $(C_2\text{-}C_4)$-alkenyl, substituted or unsubstituted phenyl, $(C_1\text{-}C_4)$-alkoxy-$(C_1\text{-}C_4)$-alkyl, phenoxy-$(C_1\text{-}C_4)$-alkyl, carbonyl-$(C_1\text{-}C_4)$-alkyl, carbonyl-$(C_2\text{-}C_4)$-alkenyl, carbonylphenyl, carbonyl-$(C_1\text{-}C_4)$-alkoxy-$(C_2\text{-}C_4)$-alkyl or carbonylphenoxy-$(C_2\text{-}C_4)$-alkyl; and
$R^{24}$ is $(C_1\text{-}C_4)$-alkoxy, $(C_2\text{-}C_4)$-alkenyloxy, substituted or unsubstituted phenyloxy, phenyl-$(C_1\text{-}C_2)$-alkoxy, phenoxy-$(C_1\text{-}C_4)$-alkoxy, $(C_2\text{-}C_4)$-alkenyloxy-$(C_1\text{-}C_4)$-alkoxy or $(C_1\text{-}C_4)$-alkoxy-$(C_1\text{-}C_4)$-alkoxy.

Exceptionally preferred disperse dyestuffs of the formula (VI) which can be used together with the dyestuffs of the general formula (I) to form inventive dyestuff mixtures are the dyestuffs of the formulae VI-1 to VI-11 as given in Table 5 below.

TABLE 5

| Dye | $R^{19}$ | $R^{20}$ |
|---|---|---|
| VI-1 | H | *—O–CH₂–C(=O)–O–CH₂CH₂–O–CH₂CH₃ |
| VI-2 | CH₃CH₂–O–* | *—O–CH₂–C(=O)–O–CH₂CH₂–O–CH₂CH₃ |
| VI-3 | CH₃CH₂CH₂–O–* | H |
| VI-4 | CH₃CH₂–O–* | H |
| VI-5 | (CH₃)₂CH–O–* | H |
| VI-6 | CH₃CH₂CH₂CH₂–O–* | H |
| VI-7 | HO–CH₂CH₂CH₂–O–* | H |
| VI-8 | (tetrahydrofurfuryl)–CH₂–O–* | H |
| VI-9 | CH₃–O–CH₂CH₂–O–CH₂–C(=O)–O–* | H |
| VI-10 | CH₃–O–CH₂CH₂–O–CH₂–C(=O)–O–* | CH₃CH₂CH₂–O–* |

TABLE 5-continued

| Dye | $R^{19}$ | $R^{20}$ |
|---|---|---|
| VI-11 | 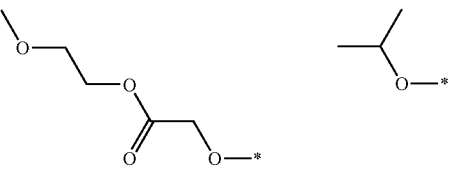 | 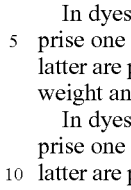 |

A still further preferred disperse dyestuff which can be used together with the dyestuffs of the formula (I) to form inventive dyestuff mixtures is the dyestuff of formula (VII)

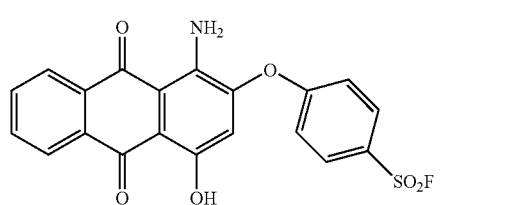

(VII)

Still further preferred disperse dyestuffs which can be used together with the dyestuffs of the formula (I) to form inventive dyestuff mixtures are the dyestuffs of formula (VIII)

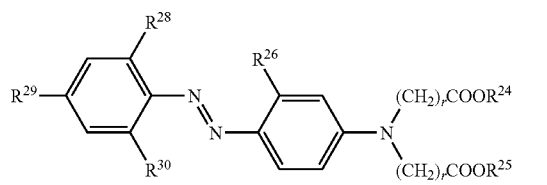

(VIII)

wherein
each of $R^{24}$ and $R^{25}$, independently is $(C_1-C_4)$-alkyl, $(C_2-C_4)$-alkenyl, substituted or unsubstituted phenyl, phenyl-$(C_1-C_4)$-alkyl or $(C_1-C_4)$-alkoxy-$(C_2-C_4)$-alkyl;
$R^{26}$ is hydrogen halogen, $(C_1-C_4)$-alkyl, $(C_1-C_4)$-alkoxy or —NHCOR$^{27}$;
each of $R^{28}$, $R^{29}$ and $R^{30}$, independently is hydrogen, chlorine, bromine, cyano or nitro;
$R^{27}$ is $(C_1-C_4)$-alkyl or $(C_1-C_4)$-alkoxy; and
r is 1, 2, 3 or 4.

Exceptionally preferred disperse dyestuffs of the formula (VIII) which can be used together with the dyestuffs of the general formula (I) to form inventive dyestuff mixtures are the dyestuffs of the formulae VIII-1 to VIII-3 as given in Table 6 below.

TABLE 6

| Dye | $R^{24}$ | $R^{25}$ | $R^{26}$ | $R^{28}$ | $R^{29}$ | $R^{30}$ | r |
|---|---|---|---|---|---|---|---|
| VIII-1 | CH$_3$ | CH$_3$ | H | Br | NO$_2$ | Cl | 2 |
| VIII-2 | CH$_3$ | CH$_3$ | NHCO$_2$CH$_3$ | NO$_2$ | NO$_2$ | H | 2 |
| VIII-3 | CH$_3$ | CH$_3$ | NHCO$_2$CH$_3$ | H | NO$_2$ | H | 2 |

Dyestuff mixtures of the present invention which comprise one or more disperse dyestuffs of the formula (I) and one or more other disperse dyestuffs preferably contain one or more disperse dyestuffs of the formula (I) in an amount of 1% to 99% by weight and especially preferably 25% to 95% by weight, based on the total weight of the mixture.

In dyestuff mixtures of the present invention which comprise one or more disperse dyestuffs of the formula (III) the latter are preferably present in an amount of 0.5% to 45% by weight and especially preferably 10% to 30% by weight.

In dyestuff mixtures of the present invention which comprise one or more disperse dyestuffs of the formula (IV) the latter are preferably present in an amount of 0.5% to 30% by weight and especially preferably 0.5% to 20% by weight.

In dyestuff mixtures of the present invention which comprise one or more disperse dyestuffs of the formula (V) the latter are preferably present in an amount of 0.5% to 50% by weight and especially preferably 0.5% to 40% by weight.

In dyestuff mixtures of the present invention which comprise one or more disperse dyestuffs of the formula (VI) the latter are preferably present in an amount of 0.5% to 30% by weight and especially preferably 0.5% to 20% by weight.

In dyestuff mixtures of the present invention which comprise the disperse dyestuff of the formula (VII) the latter is preferably present in an amount of 0.5% to 30% by weight and especially preferably 0.5% to 20% by weight.

In dyestuff mixtures of the present invention which comprise one or more disperse dyestuffs of the formula (VIII) the latter are preferably present in an amount of 0.5% to 60% by weight and especially preferably 0.5% to 20% by weight.

The disperse dye mixtures of the present invention can be prepared, for example, by mixing two or more dyestuffs of the formula (I) or by mixing one or more dyestuffs of the formula (I) with one or more other dyestuffs in the required amounts. Suitable mixing methods include
a) Co-Crystallisation Typically, the dyestuffs are dissolved in a hot solvent, for example, by placing the dyestuffs in a suitable solvent and heating up to the reflux temperature of the solvent until the dyestuffs are dissolved, thereafter filtering to provide a solution, and then allowing the solution to cool and crystals to form. The resultant dyestuff mixture may then undergo further processing, such as milling and spray drying. Examples of suitable solvents for this process are organic solvents such as aromatic hydrocarbons, chlorinated hydrocarbons, aliphatic hydrocarbons, alicyclic hydrocarbons, alcohols, amides, sulphoxides, esters, ketones and ethers. Specific examples of organic solvents are toluene, ethyl cellosolve, acetone, chlorobenzene, pyridine, dimethyl formamide, dimethylsulphoxide, ethyl acetate, benzene, tetrahydrofuran and cyclohexane.
b) Co-Milling The dyestuffs are mixed and then milled together to give an intimate blend which is then spray dried to give a solid dyestuff mixture.
c) Co-Drying Each dyestuff is milled separately and the required dyestuffs are then mixed in the required ratio before spray drying.
d) Dry-Blending Each dyestuff is spray dried separately and then the required dyestuffs are mixed in the required ratio by a dry blending process.

The dyestuffs of the (I) and (III) to (VIII) are known or are easily prepared under standard conditions known to those skilled in the art.

A particular aspect of the invention provides a composition comprising a disperse dye mixture of the present invention and additionally at least one further ingredient conventionally used in colouring applications such as a dispersing agent and optionally a surfactant or wetting agent. The composition typically comprises from 1% to 65%, preferably 10 to 60%, more preferably 20 to 55% by weight, of the total dye mixture in a solid medium.

Typical examples of dispersing agent are lignosulphonates, naphthalene sulphonic acid/formaldehyde condensates and phenol/cresol/sulphanilic acid/formaldehyde condensates. Typical examples of wetting agent are alkyl aryl ethoxylates which may be sulphonated or phosphated and typical examples of other ingredients which may be present are inorganic salts, de-foamers such as mineral oil or nonanol, organic liquids and buffers. Dispersing agents may be present at from 10% to 200% on the weight of the dye mixtures. Wetting agents may be used at from 0.1% to 20% on the weight of the dye mixtures.

These compositions may be prepared by bead milling the disperse dye mixtures of the present invention with glass beads or sand in an aqueous medium. The compositions may have further additions of dispersing agents, fillers and other surfactants and may be dried, by a technique such as spray drying, to give a solid composition comprising from 5% to 65% by weight of dyestuff.

The disperse dye mixtures of the present invention, preferably in form of the compositions described above, are useful for colouring synthetic materials, especially synthetic textile materials and fibre blends thereof.

Accordingly, the present invention provides a process for colouring synthetic materials, especially synthetic textile materials and fibre blends thereof, which process comprises applying to the synthetic material a dyestuff mixture according to the present invention.

Preferred synthetic textile materials may be selected from aromatic polyester, especially polyethylene terephthalate and micro-fibre constructions thereof (including both, sea island and conjugate micro-fibres), polyamide, especially polyhexamethylene adipamide, secondary cellulose acetate, cellulose triacetate, polyurethanes and natural textile materials, especially cellulosic materials and wool. An especially preferred textile material is an aromatic polyester or fibre blend thereof with fibres of any of the above mentioned textile materials. Especially preferred fibre blends include those of polyester-cellulose, such as polyester-cotton, polyester-wool, polyester/polyurethane and polyester/poly-amide in the form of a conjugate micro-fibre. The textile materials or blends thereof may be in the form of filaments, loose fibres, yarn or woven or knitted fabrics.

The disperse dye mixtures of the present invention colour the materials mentioned above in deep black shades with excellent levels of wet fastness.

The disperse dye mixtures of the present invention may be applied to the synthetic textile materials or fibre blends by processes which are conventionally employed in applying disperse dyes to such materials and fibre blends. Suitable process conditions may be selected from the following (i) exhaust dyeing at a pH of from 4 to 6.5, at a temperature of from 125° C. to 140° C. for from 10 to 120 minutes and under a pressure of from 1 to 2 bar, a sequestrant optionally being added;
(ii) continuous dyeing at a pH of from 4 to 6.5, at a temperature of from 190° C. to 225° C. for from 15 seconds to 5 minutes, a migration inhibitor optionally being added;
(iii) direct printing at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 120° C. to 140° C. and 1 to 2 bar for from 10 to 45 minutes for pressure steaming, wetting agents and thickeners (such as alginates) of from 5 to 100% by weight of the dye optionally being added;
(iv) discharge printing (by padding the dye on to the textile material, drying and overprinting) at a pH of from 4 to 6.5, migration inhibitors and thickeners optionally being added;
(v) carrier dyeing at a pH of from 4 to 6.5, at a temperature of from 95° C. to 100° C. using a carrier such as methylnaphthalene, diphenylamine or 2-phenylphenol, sequestrants optionally being added; and
(vi) atmospheric dyeing of acetate, triacetate and nylon at a pH of from 4 to 6.5, at a temperature of 85° C. for acetate or at a temperature of 90° C. for triacetate and nylon for from 15 to 90 minutes, sequestrants optionally being added In all the above processes, the dye mixture is applied as a dispersion comprising from 0.001% to 20%, preferably from 0.005 to 16% by weight, of the disperse dye mixtures of the present invention in an aqueous medium.

In addition to the above-mentioned application processes, the dye mixtures may be applied to synthetic textile materials and fibre blends by ink-jet printing. For ink-jet applications, the application medium may comprise water, dispersing agents, biocides, and a water-soluble organic solvent, preferably in a weight ratio of 1:99 to 99:1, more preferably 1:95 to 50:50 and especially in the range 10:90 to 40:60. The water-soluble organic solvent preferably comprises a $C_{1-4}$-alkanol, especially methanol or ethanol, a ketone, especially acetone or methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl) sulphone or mixtures thereof.

In contrast to conventional textile printing, in inkjet printing the auxiliaries have to be applied to the textile substrate in a separate pretreatment step. The pretreatment of the textile substrate is effected with thickeners to prevent flowing of the motives when the printing ink is applied, for example sodium alginates, modified polyacrylates or highly etherified galactomannanes.

These pretreatment reagents are uniformly applied to the textile substrate in a defined amount using suitable applicators, for example using a 2- or 3-roll pad, contact less spraying technologies, by means of foam application or using appropriately adapted inkjet technologies, and subsequently dried.

After printing, the textile fiber material is dried at 120 to 150° C. and subsequently fixed.

The fixing of the inkjet prints prepared with reactive dyes may be effected at room temperature or with saturated steam, with superheated steam, with hot air, with microwaves, with infrared radiation, with laser or electron beams or with other suitable energy transfer techniques.

The disperse dye mixtures of the present invention may also be applied to textile materials using supercritical carbon dioxide, in which case the dye formulating agents may optionally be omitted.

The disperse dye mixtures of the present invention may also be used in, for example, ink jet printing of non-textiles, dye diffusion and in the colouration of plastics.

Embodiments of the present invention will now be described in more detail with reference to the following examples, in which parts are by weight unless otherwise stated.

Example 1

A mixture of 30 parts of dyestuff I-7 and 24 parts of dyestuff I-30 was mixed with 22 parts of a dye of dyestuff III-1, 5 parts of dyestuff IV-1, 5 parts of dyestuff IV-2, 13 parts of dyestuff V-18 and 1 part of dyestuff V-1. Then the mixture was milled as 40% aqueous slurry with 45 parts of a high temperature stable dispersing agent until the dye particle size (mean diameter) was in the range 0.1-5 microns.

This dispersion was standardised to a solid brand containing 36% of the mixture and 64% dispersing agent, by the addition of 99.7 parts of a 'filler'/'cutting' agent and drying to either a grain or powder form in a spray dryer. This product is especially suitable for the exhaust dyeing of polyester (including microfibre and weight reduced polyester), polyester/cellulose polyester/polyurethane, polyester/nylon especially conjugate microfibre) and polyester/wool blends and can also be used for continuous dyeing and direct printing.

A dye bath for the exhaust dyeing of polyester in piece form was prepared by adding 11.5 ml of an aqueous dispersion of the solid brand (2 g dye in 100 ml water at 40-50° C.) to 57.5 ml of de-ionised water and 1.2 ml of buffer solution. To this dye bath was added a 5 g piece of polyester and the whole was held for 45 minutes at 130° C. in a Werner Mathis Labomat high temperature dyeing machine. After rinsing with water and a reduction clearing treatment, the material was dyed a deep black shade with excellent wet fastness. An interesting feature of the mixture is its excellent build-up performance on polyester and especially polyester microfibre, where proportionately more dye has to be applied to obtain the same visual yield compared with conventional polyester.

Example 2

A 3 component mixture of 72 parts of dyestuff I-7, 24 parts of dyestuff III-1 and 4 parts of dyestuff V-18 was prepared by intimate mixing. The mixture was then milled as 40% aqueous slurry with 50 parts of a high temperature stable dispersing agent until the dye particle size (mean diameter) was in the range 0.1-5 microns.

This dispersion was standardised to a solid brand containing 40% of the mixture and 60% dispersing agent, by the addition of 81.5 parts of a 'filler'/'cutting' agent and drying to either a grain or powder form in a spray dryer. This product is especially suitable for the exhaust dyeing of polyester (including microfibre and weight reduced polyester), polyester/cellulose polyester/polyurethane, polyester/nylon especially conjugate microfibre) and polyester/wool blends and can also be used for continuous dyeing and direct printing.

A dye bath for the exhaust dyeing of polyester in piece form was prepared by adding 11.25 ml of an aqueous dispersion of the solid brand (2 g dye in 100 ml water at 40-50° C.) to 57 ml of de-ionised water and 1.2 ml of buffer solution. To this dye bath was added a 5 g piece of polyester and the whole was held for 45 minutes at 130° C. in a Werner Mathis Labomat high temperature dyeing machine. After rinsing with water and a reduction clearing treatment, the material was dyed a deep navy shade with excellent wet fastness. An interesting feature of the mixture is its excellent build-up performance on polyester and especially polyester micro fibre, where proportionately more dye has to be applied to obtain the same visual yield compared with conventional polyester.

Example 3

A mixture of 39 parts of dyestuff I-15, 10 parts of dyestuff I-24, 4 parts of dyestuff IV-1, 4 parts of dyestuff IV-2, 23 parts of dyestuff V-1, 10 parts of dyestuff VI-1 and 10 parts of dyestuff VII are mixed. When milled as 40% aqueous slurry with 100 parts of a high temperature stable dispersing agent until the dye particle size (mean diameter) was in the range 0.1-5 microns.

This dispersion was standardised to a solid brand containing 40% of the mixture and 60% dispersing agent, by the addition of 81.5 parts of a 'filler'/'cutting' agent and drying to either a grain or powder form in a spray dryer. This product is especially suitable for the exhaust dyeing of polyester (including microfibre and weight reduced polyester), polyester/cellulose polyester/polyurethane, polyester/nylon especially conjugate microfibre) and polyester/wool blends and can also be used for continuous dyeing and direct printing.

A dye bath for the exhaust dyeing of polyester in piece form was prepared by adding 11.25 ml of an aqueous dispersion of the solid brand (2 g dye in 100 ml water at 40-50° C.) to 57 ml of de-ionised water and 1.2 ml of buffer solution. To this dye bath was added a 5 g piece of polyester and the whole was held for 45 minutes at 130° C. in a Werner Mathis Labomat high temperature dyeing machine. After rinsing with water and a reduction clearing treatment, the material was dyed a deep black shade with excellent wet fastness. An interesting feature of the mixture is its excellent build-up performance on polyester and especially polyester micro fibre, where proportionately more dye has to be applied to obtain the same visual yield compared with conventional polyester.

Example 4

A mixture of 36 parts of dyestuff I-7, 9 parts of dyestuff I-24 and 55 parts of dyestuff VIII-1 was prepared by intimate mixing. It was then milled as 40% aqueous slurry with 45 parts of a high temperature stable dispersing agent until the dye particle size (mean diameter) was in the range 0.1-5 microns.

This dispersion was standardised to a solid brand containing 36% of the mixture and 64% dispersing agent, by the addition of 99.5 parts of a 'filler'/'cutting' agent and drying to either a grain or powder form in a spray dryer. This product is especially suitable for the exhaust dyeing of polyester (including microfibre and weight reduced polyester), polyester/cellulose polyester/polyurethane, polyester/nylon especially conjugate microfibre) and polyester/wool blends and can also be used for continuous dyeing and direct printing.

A dye bath for the exhaust dyeing of polyester in piece form was prepared by adding 11.5 ml of an aqueous dispersion of the solid brand (2 g dye in 100 ml water at 40-50° C.) to 57 ml of de-ionised water and 1.2 ml of buffer solution. To this dye bath was added a 5 g piece of polyester and the whole was held for 45 minutes at 130° C. in a Werner Mathis Labomat high temperature dyeing machine. After rinsing with water and a reduction clearing treatment, the material was dyed a deep black shade with excellent wet fastness. An interesting feature of the mixture is its excellent build-up performance on polyester and especially polyester microfibre, where proportionately more dye has to be applied to obtain the same visual yield compared with conventional polyester.

Example 5

A textile fabric of polyester was pretreated using a liquor 50 g/l of a 8% sodium alginate solution, 100 g/l of a 8-12% galactomannane solution and 5 g/l of sodium dihydrogen phosphate in water and then dried. The wet pickup is 70%.

The thus pretreated textile is printed with an aqueous ink containing

6% of the dyestuff mixture according to example 6 in table 7
1.5% of dispersing agent Disperbyk 190
10% of 2-propanol
20% of polyethylene glycol 200
0.01% of biocide Mergal K9N
62.49% of water
using a drop-on-demand (bubble jet) inkjet print head. The print is completely dried.

It is fixed by means of saturated steam at 175° C. for 7 minutes.
The print is then rinsed warm, subjected to a fastness wash with hot water at 95° C., rinsed warm and then dried.
The result is black shade print having excellent use fastnesses.
Further inventive dyestuff mixtures were obtained by mixing the dyestuffs of Table 7 in the amounts given as weight %.

TABLE 7

| | Dyestuff/amout in % by weight based on the total weight of the mixture | | | | | | | | | | | | | |
|---|---|---|---|---|---|---|---|---|---|---|---|---|---|---|
| Ex. | (I)$^1$ | (I)$^2$ | (I)$^3$ | (III) | (IV)$^1$ | (IV)$^2$ | (V)$^1$ | (V)$^2$ | (V)$^3$ | (VI)$^1$ | (VI)$^2$ | (VI)$^3$ | (VII) | (VIII) |
| 6 | I-7/28 | I-30/10 | | III-1/22 | IV-2/10 | | V-18/19 | V-1/9 | | | | | | |
| 7 | I-4/29 | I-24/10 | | III-1/21 | IV-1/5 | IV-2/5 | V-18/17 | V-1/13 | | | | | | |
| 8 | I-4/33 | I-24/19 | I-30/48 | | | | | | | | | | | |
| 9 | I-4/36 | I-24/9 | | | | | | | | | | | | VIII-1/55 |
| 10 | I-4/49 | I-31/27 | | | | | V-1/24 | | | | | | | |
| 11 | I-4/27 | I-24/12 | | III-1/18 | IV-2/7 | | V-18/9 | V-19/9 | V-1/14 | | | | | VIII-2/4 |
| 12 | I-4/27 | I-24/19 | | III-1/19 | IV-2/7 | | V-18/12 | V-19/12 | V-1/11 | | | | | |
| 13 | I-4/83 | I-24/13 | | | | | V-18/4 | | | | | | | |
| 14 | I-4/29 | I-24/12 | | III-1/21 | IV-2/6 | | V-18/11 | V-19/11 | V-1/10 | | | | | |
| 15 | I-7/29 | I-24/10 | | III-1/23 | IV-!/5 | IV-2/5 | V-18/17 | V-19/11 | | | | | | |
| 16 | I-7/81 | I-24/14 | | | | | V-18/5 | | | | | | | |
| 17 | I-4/23 | I-24/11 | I-30/48 | III-1/18 | | | | | | | | | | |
| 18 | I-7/27 | I-24/12 | | III-1/22 | IV-2/7 | | V-18/20 | V-1/12 | | | | | | |
| 19 | I-4/43 | I-32/23 | | III-1/17 | | | V-18/8 | V-1/9 | | | | | | |
| 20 | I-4/39 | | | III-1/20 | | | V-18/14 | V-1/13 | | VI-1/14 | | | | |
| 21 | I-4/29 | I-17/24 | I-24/13 | | | | V-18/15 | V-1/15 | | | | | | VIII-2/4 |
| 22 | I-15/45 | I-24/13 | | | | | V-18/14 | V-1/14 | | VI-1/14 | | | | |
| 23 | I-15/27 | I-16/29 | I-24/14 | | | | V-18/16 | V-1/14 | | | | | | |
| 24 | I-15/28 | I-17/27 | I-24/14 | | | | V-18/17 | V-1/14 | | | | | | |
| 25 | I-16/24 | I-17/22 | I-24/12 | | IV-1/6 | IV-2/6 | V-18/15 | V-1/15 | | | | | | |
| 26 | I-4/62 | I-24/21 | | | | | V-18/17 | | | | | | | |
| 27 | I-4/36 | I-24/14 | I-31/8 | | IV-1/6 | IV-2/6 | V-18/16 | V-1/14 | | | | | | |
| 28 | I-4/35 | I-25/14 | | | IV-1/6 | IV-2/6 | V-18/14 | V-1/12 | | VI-1/13 | | | | |
| 29 | I-4/34 | I-24/12 | | | IV-1/7 | IV-2/7 | V-18/17 | V-1/13 | | VI-2/10 | | | | |
| 30 | I-4/42 | I-24/9 | | | IV-1/6 | IV-2/6 | V-18/15 | V-1/13 | | VI-1/2 | VI-2/5 | VI-3/2 | | |
| 31 | I-4/42 | I-24/9 | | | IV-1/6 | IV-2/6 | V-18/10 | V-19/12 | V-1/10 | VI-1/1 | VI-2/3 | VI-3/1 | | |
| 32 | I-4/36 | I-24/14 | I-31/14 | | IV-1/7 | IV-2/7 | V-1/14 | V-21/8 | | | | | | |
| 33 | I-15/30 | I-30/24 | | III-5/22 | IV-1/5 | IV-2/5 | V-18/13 | V-1/1 | | | | | | |
| 34 | I-2/27 | I-22/19 | | III-1/19 | IV-2/7 | | V-18/12 | V-25/12 | V-1/11 | | | | | |
| 35 | I-18/29 | I-26/12 | | III-1/21 | IV-2/6 | | V-18/11 | V-25/11 | V-3/10 | | | | | |
| 36 | I-4/27 | I-24/12 | | III-1/18 | IV-2/7 | | V-18/9 | V-25/9 | V-3/14 | | | | | VIII-3/4 |
| 37 | I-2/29 | I-22/10 | | III-1/18 | IV-2/7 | | V-18/9 | V-25/9 | V-3/14 | | | | | VIII-3/4 |
| 38 | I-15/35 | I-25/14 | | | IV-1/6 | IV-2/6 | V-25/14 | V-3/12 | | VI-1/13 | | | | |
| 39 | I-4/33 | I-24/19 | I-33/48 | | | | | | | | | | | |
| 40 | I-7/29 | I-24/10 | | III-11/23 | IV-1/5 | IV-2/5 | V-18/17 | V-19/11 | | | | | | |
| 41 | I-18/30 | I-30/24 | | III-1/22 | IV-1/5 | IV-2/5 | V-25/13 | V-1/1 | | | | | | |
| 42 | I-2/42 | I-24/9 | | | IV-1/6 | IV-2/6 | V-18/15 | V-1/13 | | VI-1/2 | VI-2/5 | VI-3/2 | | |
| 43 | I-4/80 | I-26/16 | | | | | V-18/4 | | | | | | | |
| 44 | I-4/39 | | | III-5/20 | | | V-18/14 | V-1/13 | | VI-1/14 | | | | |
| 45 | I-7/29 | I-22/10 | | III-1/23 | IV-!/5 | IV-2/5 | V-25/17 | V-19/11 | | | | | | |
| 46 | I-2/43 | I-32/23 | | III-5/17 | | | V-18/8 | V-1/9 | | | | | | |
| 47 | I-18/35 | I-25/14 | | | IV-1/6 | IV-2/6 | V-18/14 | V-3/12 | | VI-1/13 | | | | |
| 48 | I-15/45 | I-24/13 | | | | | V-25/14 | V-1/14 | | VI-1/14 | | | | |
| 49 | I-2/30 | I-30/24 | | III-5/22 | IV-1/5 | IV-2/5 | V-18/13 | V-1/1 | | | | | | |
| 50 | I-15/34 | I-24/12 | | | IV-1/7 | IV-2/7 | V-18/17 | V-3/13 | | VI-2/10 | | | | |
| 51 | I-15/37 | I-24/10 | | | IV-1/6 | IV-2/6 | V-1/23 | | | VI/8 | | | VII/10 | |

The invention claimed is:
1. A disperse dye mixture comprising
(a) two or more disperse dyestuffs of the formula (I)

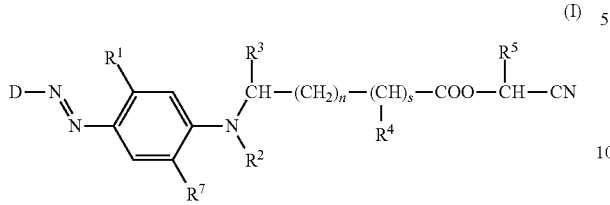
(I)

wherein
D is a group of the formula (IIa)

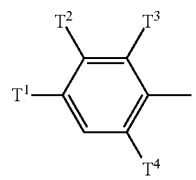
(IIa)

wherein
$T^1$, $T^2$ and $T^3$ are, independently, hydrogen, halogen or nitro;
$T^4$ is hydrogen, halogen, cyano or nitro;
wherein at least one of $T^1$, $T^2$, $T^3$ and $T^4$ is not hydrogen;
or a group of the formula (IIb)

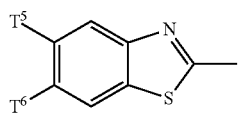
(IIb)

wherein
$T^5$ is hydrogen or halogen; and
$T^6$ is hydrogen —$SO_2CH_3$, —SCN or nitro;
wherein at least one of $T^5$ and $T^6$ is not hydrogen;
or a group of the formula (IIc)

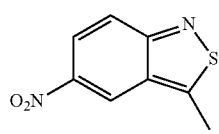
(IIc)

or a group of the formula (IId)

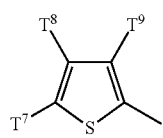
(IId)

wherein
$T^7$ is nitro, —CHO or a group of the formula

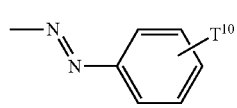

wherein $T^{10}$ is hydrogen, halogen, nitro or cyano;
$T^8$ is hydrogen or halogen; and
$T^9$ is nitro, cyano, —$COCH_3$ or —$COOT^{11}$, wherein $T^{11}$ is $(C_1-C_4)$-alkyl;

or a group of the formula (IIe)

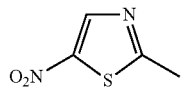
(IIe)

$R^1$ is hydrogen, $(C_1-C_4)$-alkyl or —$NHCOR^6$, where $R^6$ is $(C_1-C_4)$-alkyl or phenyl;
$R^2$ is unsubstituted $(C_1-C_6)$-alkyl, benzyl or phenylethyl;
$R^3$ is hydrogen or methyl;
$R^4$ is hydrogen or methyl;
$R^5$ is hydrogen, methyl or phenyl;
$R^7$ is hydrogen, chloro, methoxy or ethoxy;
n is 0, 1 or 2 and;
s is 0 or 1;
or
(b) one or more disperse dyestuffs of the formula (I) as defined above and one or more other disperse dyestuffs.
2. The disperse dye mixture according to claim 1, wherein the dyestuff of the formula (I) is of the formula (Ia)

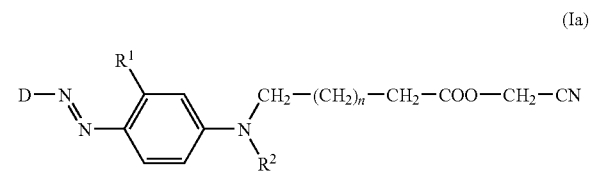
(Ia)

wherein
D is a group of the formulae (IIa), (IIb), (IIc), (IId) or (IIe);
$R^1$ is $(C_1-C_4)$-alkyl;
$R^2$ is unsubstituted $(C_1-C_6)$-alkyl, benzyl or phenylethyl; and
n is 0, 1 or 2;
or is of the formula (Ib)

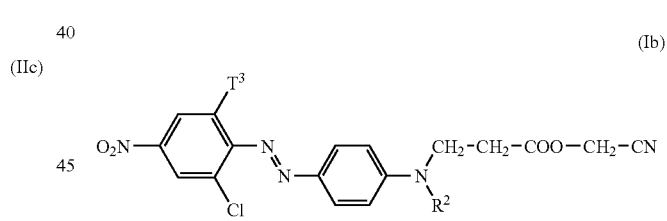
(Ib)

wherein
$T^3$ is bromo or chloro; and
$R^2$ is unsubstituted $(C_1-C_6)$-alkyl, benzyl or phenylethyl;
or is of the formula (Ic)

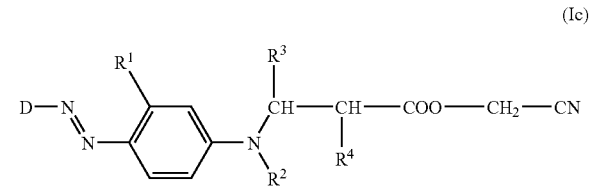
(Ic)

wherein
D is a group of the formulae (IIa), (IIb), (IIc), (IId) or (IIe);
$R^1$ is hydrogen, $(C_1-C_4)$-alkyl or —$NHCOR^6$, where $R^6$ is $(C_1-C_4)$-alkyl or phenyl;
$R^2$ is unsubstituted $(C_1-C_6)$-alkyl, benzyl or phenylethyl; and $R^3$ is hydrogen and $R^4$ is methyl or $R^3$ is methyl and $R^4$ is hydrogen;
or is of the formula (Id)

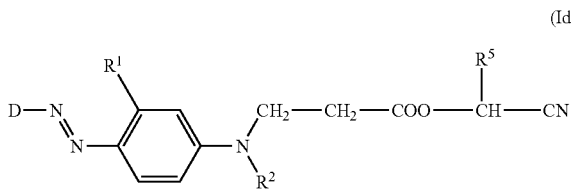

wherein
D is a group of the formulae (IIa), (IIb), (IIc), (IId) or (IIe);
$R^1$ is hydrogen, $(C_1-C_4)$-alkyl or —NHCOR$^6$, where $R^6$ is $(C_1-C_4)$-alkyl or phenyl;
$R^2$ is unsubstituted $(C_1-C_6)$-alkyl, benzyl or phenylethyl; and $R^5$ is methyl or phenyl;
or is of the formula (Ie)

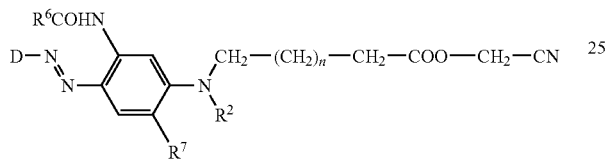

wherein
D is a group of the formulae (IIa), (IIb), (IIc), (IId) or (IIe);
$R^2$ is unsubstituted $(C_1-C_6)$-alkyl, substituted $(C_1-C_6)$-alkyl, benzyl or phenylethyl;
$R^6$ is $(C_1-C_4)$-alkyl or phenyl;
$R^7$ is chloro, methoxy or ethoxy; and
n is 0, 1 or 2;
or is of the formula (If)

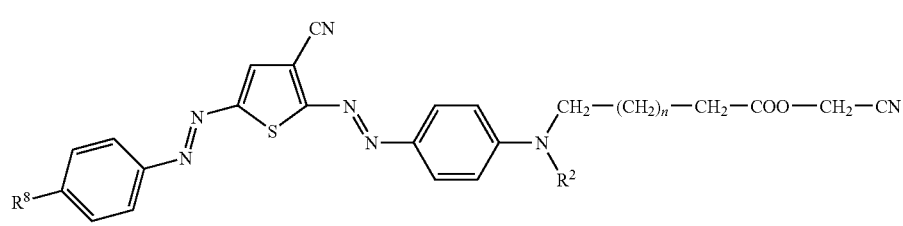

wherein
$R^2$ is unsubstituted $(C_1-C_6)$-alkyl, benzyl or phenylethyl;
$R^8$ is nitro; and
n is 0, 1 or 2;
or is of the formula (Ig)

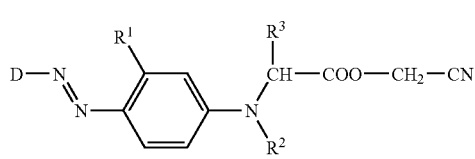

wherein
D is a group of the formulae (IIa), (IIb), (IIc), (IId) or (IIe);
$R^1$ is hydrogen, $(C_1-C_4)$-alkyl or —NHCOR$^6$, where $R^6$ is $(C_1-C_4)$-alkyl or phenyl;

$R^2$ is unsubstituted $(C_1-C_6)$-alkyl, benzyl or phenylethyl; and $R^3$ is hydrogen or methyl.

3. The disperse dye mixture according to claim 2, wherein the dyestuff of the formula (I) is of the formula (Ia)
wherein
$R^1$ is methyl;
$R^2$ is ethyl; and
n is 0;
or is of the formula (Ib)
wherein
$T^3$ is bromo or chloro; and
$R^2$ is ethyl, benzyl or phenethyl.

4. The disperse dye mixture according to claim 1, which comprises a dyestuff of the formula (III)

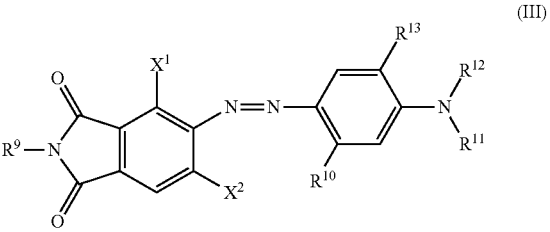

wherein
each of $X^1$ and $X^2$, independently are hydrogen or cyano;
$R^9$ is $(C_2-C_{10})$-alkyl or —$(CH_2)_o$COOR$^{14}$;
$R^{10}$ is hydrogen, methyl, cyanomethyl, halogenmethyl, ethyl, cyanoethyl, halogenethyl, halogen, —NH—CO—R$^{15}$ or —NH—SO$_2$—R$^{15}$;
$R^{11}$ is unsubstituted $(C_1-C_8)$-alkyl or $(C_1-C_8)$-alkyl substituted by hydroxy, $(C_1-C_4)$-alkoxy, cyano, halogen, —OCOR$^{15}$, COOR$^{15}$, vinyl or phenyl; $R^{12}$ is hydrogen, unsubstituted $(C_1-C_8)$-alkyl or $(C_1-C_8)$-alkyl substituted by hydroxy, $(C_1-C_4)$-alkoxy, cyano, halogen, —OCOR$^7$, COOR$^7$, vinyl or phenyl;
$R^{13}$ is hydrogen, halogen, $(C_1-C_4)$-alkyl, unsubstituted $(C_1-C_8)$-alkoxy or $(C_1-C_8)$-alkoxy substituted by halogen, cyano or phenyl;
$R^{14}$ is $(C_1-C_4)$-alkyl;
$R^{15}$ is unsubstituted $(C_1-C_8)$-alkyl or $(C_1-C_8)$-alkyl substituted by halogen or cyano; and
o is 1, 2, 3, 4 or 5.

5. The disperse dye mixture according to claim 1, which comprises a dyestuff of formula (IV)

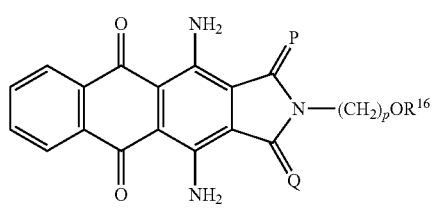

wherein
P and Q are both O or one is O and one is NH;

p is 1, 2, 3 or 4; and
$R^{16}$ is hydrogen, $(C_1-C_4)$-alkyl or $(C_1-C_4)$-alkoxyalkyl.

6. The disperse dye mixture according to claim 1, which comprises a dyestuff of formula (V)

(V)

wherein
$R^{17}$ is hydrogen, $(C_1-C_4)$-alkyl, $(C_1-C_4)$-alkoxy-$(C_1-C_4)$-alkyl or aryloxy-$(C_1-C_4)$-alkyl;
X is hydrogen, halogen, $(C_1-C_4)$-alkyl, nitro or cyano;
Y is hydrogen, halogen, $(C_1-C_4)$-alkyl, nitro, $(C_1-C_4)$-alkoxy-$(C_1-C_4)$-alkoxy-$(C_1-C_4)$-alkoxycarbonyl, aryl-$(C_1-C_4)$-alkoxycarbonyl, mono- or di-$(C_1-C_4)$-alkylamino-carbonyl, $(C_1-C_4)$-alkyl-$(C_1-C_4)$-alkoxycarbonyl or $R^{18}SO_2$;
Z is hydrogen, hydroxyl, halogen, aryloxy-$(C_1-C_4)$-alkoxycarbonyl, aryl-$(C_1-C_4)$-alkoxycarbonyl, —OSO$_2$aryl or $R^{18}SO_2$; and
$R^{18}$ is aryloxy, or mono- or di-$(C_1-C_4)$-alkylamino.

7. The disperse dye mixture according to claim 1, which comprises a dyestuff of formula (VI)

(VI)

wherein
$R^{19}$ and $R^{20}$ independently are hydrogen, $(C_1-C_4)$-alkoxy, $(C_2-C_4)$-alkenyloxy or —O(CH$_2$)$_q$R$^{22}$
wherein
q is an integer from 1 to 6; and
$R^{22}$ is —OR$^{23}$ or —COR$^{24}$;
where
$R^{23}$ is hydrogen, $(C_1-C_4)$-alkyl, $(C_2-C_4)$-alkenyl, substituted or unsubstituted phenyl, $(C_1-C_4)$-alkoxy-$(C_1-C_4)$-alkyl, phenoxy-$(C_1-C_4)$-alkyl, carbonyl-$(C_1-C_4)$-alkyl, carbonyl-$(C_2-C_4)$-alkenyl, carbonylphenyl, carbonyl-$(C_1-C_4)$-alkoxy-$(C_2-C_4)$-alkyl or carbonylphenoxy-$(C_2-C_4)$-alkyl; and
$R^{24}$ is $(C_1-C_4)$-alkoxy, $(C_2-C_4)$-alkenyloxy, substituted or unsubstituted phenyloxy, phenyl-$(C_1-C_2)$-alkoxy, phenoxy-$(C_1-C_4)$-alkoxy, $(C_2-C_4)$-alkenyloxy-$(C_1-C_4)$-alkoxy or $(C_1-C_4)$-alkoxy-$(C_1-C_4)$-alkoxy.

8. The disperse dye mixture according to claim 1, which comprises the dyestuff of formula (VII)

(VII)

9. The disperse dye mixture according to claim 1, which comprises a dyestuff of formula (VIII)

(VIII)

wherein
each of $R^{24}$ and $R^{25}$, independently is $(C_1-C_4)$-alkyl, $(C_2-C_4)$-alkenyl, substituted or unsubstituted phenyl, phenyl-$(C_1-C_4)$-alkyl or $(C_1-C_4)$-alkoxy-$(C_2-C_4)$-alkyl;
$R^{26}$ is hydrogen halogen, $(C_1-C_4)$-alkyl, $(C_1-C_4)$-alkoxy or —NHCOR$^{27}$;
each of $R^{28}$, $R^{29}$ and $R^{30}$, independently is hydrogen, chlorine, bromine, cyano or nitro;
$R^{27}$ is $(C_1-C_4)$-alkyl or $(C_1-C_4)$-alkoxy; and
r is 1, 2, 3 or 4.

10. A process for the preparation of the disperse dye mixture as claimed claim 1, which comprises mixing two or more dyestuffs of the formula (I) or by mixing one or more dyestuffs of the formula (I) with one or more other dyestuffs.

11. A process of coloring a synthetic material which comprises contacting the synthetic material with the a disperse dye mixture as claimed in claim 1.

12. Ink for injet printing which contains the disperse dye mixture as claimed in claim 1.

13. The disperse dye mixture according to claim 1, wherein $R^1$ is hydrogen or $(C_1-C_4)$-alkyl.

14. The disperse dye mixture according to claim 1, consisting essentially of
(a) two or more disperse dyestuffs of the formula (I) or
(b) one or more disperse dyestuffs of the formula (I) as defined above and one or more other disperse dyestuffs.

15. The disperse dye mixture according to claim 13, consisting essentially of
(a) two or more disperse dyestuffs of the formula (I) or
(b) one or more disperse dyestuffs of the formula (I) as defined above and one or more other disperse dyestuffs.

16. The disperse dye mixture according to claim 1, consisting essentially of two or more disperse dyestuffs of the formula (I).

17. The disperse dye mixture according to claim 13, comprising two or more disperse dyestuffs of the formula (I).

* * * * *